(12) United States Patent
Mito et al.

(10) Patent No.: US 10,096,847 B2
(45) Date of Patent: Oct. 9, 2018

(54) AIR INTAKE STRUCTURE AND FUEL CELL VEHICLE

(71) Applicant: HONDA MOTOR CO., LTD., Tokyo (JP)

(72) Inventors: Toshinobu Mito, Wako (JP); Nobuhiko Kamagata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 58 days.

(21) Appl. No.: 15/296,042

(22) Filed: Oct. 18, 2016

(65) Prior Publication Data

US 2017/0110744 A1 Apr. 20, 2017

(30) Foreign Application Priority Data

Oct. 19, 2015 (JP) .................................. 2015-205811

(51) Int. Cl.
| | |
|---|---|
| *H01M 8/06* | (2016.01) |
| *H01M 8/04119* | (2016.01) |
| *B60K 13/02* | (2006.01) |
| *B60L 11/18* | (2006.01) |
| *H01M 8/04082* | (2016.01) |

(52) U.S. Cl.
CPC ......... *H01M 8/04119* (2013.01); *B60K 13/02* (2013.01); *B60L 11/1898* (2013.01); *H01M 8/04201* (2013.01); *H01M 2250/20* (2013.01); *Y02T 90/32* (2013.01)

(58) Field of Classification Search
CPC ......... H01M 8/04119; H01M 8/04201; H01M 2250/20
See application file for complete search history.

(56) References Cited

U.S. PATENT DOCUMENTS 9,669,729 B2 * 6/2017 Ohashi ................ B60L 11/1883

FOREIGN PATENT DOCUMENTS

JP 2002-370544 12/2002

* cited by examiner

*Primary Examiner* — Jane J Rhee
(74) *Attorney, Agent, or Firm* — Mori & Ward, LLP (57) ABSTRACT

An air intake structure for a fuel cell vehicle includes an air inlet port, an air passage, and a water separation passage. The air inlet port is provided in a front space of the fuel cell vehicle in which a fuel cell is accommodated. The air passage is connected to the air inlet port such that air flows from the air inlet port to the fuel cell through the air passage. The air passage has a branch point and a first minimum passage sectional area located downstream with respect to the branch point. The water separation passage has a downstream opening in the front space and extending from the branch point to the downstream opening below the air passage to separate water from the air. The water separation passage has a second minimum passage sectional area which is smaller than the first minimum passage sectional area.

14 Claims, 10 Drawing Sheets

AIR INTAKE STRUCTURE AND FUEL CELL VEHICLE

CROSS REFERENCE TO RELATED APPLICATIONS

The present application claims priority under 35 U.S.C. § 119 to Japanese Patent Application No. 2015-205811, filed Oct. 19, 2015, entitled "Air Intake Structure and Fuel Cell Vehicle Including the Same." The contents of this application are incorporated herein by reference in their entirety.

BACKGROUND

1. Field

The present disclosure relates to an air intake structure and a fuel cell vehicle.

2. Description of the Related Art

Some conventional FF-type fuel cell vehicles have a structure in which a fuel cell is installed in a vehicle motor room (see Japanese Unexamined Patent Application Publication No. 2002-370544). In the fuel cell vehicle, a motor and a voltage control unit along with the fuel cell are disposed in the same motor room. The motor room corresponds to an engine room of a general gasoline engine vehicle, and a drive motor is disposed in the motor room. An air intake structure for taking in air is provided in the motor room of the fuel cell vehicle. This is because the fuel cell vehicle also requires air (oxygen) to generate electricity in the fuel cell.

It is desirable that the air intake structure of the fuel cell vehicle takes in air that is not so hot. The reason is that hot intake air promotes dryness within the fuel cell, degrading power generation performance. However, a radiator is provided on the front side of the motor room, and air in the motor room is heated (to, for example, 90° C.). For this reason, the air inlet port of the air intake structure is desirably provided in the front portion (in the rear of a radiator grill and in front of the radiator) of the vehicle. However, when the air inlet port is provided in the front portion of the vehicle, at flood or rainfall, water (including snow) is likely to enter the air intake structure. As a countermeasure, a large-capacity air cleaner case is provided downstream of the air intake structure to separate water having entered therein.

SUMMARY

According to one aspect of the present invention, an air intake structure used for a fuel cell vehicle equipped with a fuel cell in front space of the vehicle, the air intake structure includes an air inlet port, an air passage, and a water separation passage. The air inlet port is disposed in a front portion of the front space. Air flows from the air inlet port to the fuel cell through the air passage. The water separation passage branches downward from a branch point in a middle of the air passage to separate water entrained in the air. The water separation passage has a downstream opening on a downstream side in the front space. A minimum passage sectional area of the air passage located downstream of the branch point is larger than a minimum passage sectional area of the water separation passage.

According to another aspect of the present invention, an air intake structure for a fuel cell vehicle, includes an air inlet port, an air passage, and a water separation passage. The air inlet port is provided in a front space in which a fuel cell is accommodated. The front space being provided at a front of the fuel cell vehicle which has a vehicle height direction. The air passage is connected to the air inlet port such that air flows from the air inlet port to the fuel cell through the air passage. The air passage has a branch point and a first minimum passage sectional area located downstream with respect to the branch point. The water separation passage has a downstream opening in the front space and extending from the branch point to the downstream opening below the air passage in the vehicle height direction to separate water from the air. The water separation passage has a second minimum passage sectional area which is smaller than the first minimum passage sectional area.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Each embodiment of the present disclosure will be described below in detail with reference to figures. The figures referred to in following description schematically illustrates each embodiment. For this reason, scale, relative spacing, and positional relation of members may be exaggerated, or the members may be partially omitted. In the following description, the same or equivalent members are basically given the same name or reference numeral, and overlapping description is omitted as appropriate. Directions illustrated in the figures indicate relative directions and positional relations between components, and do not intend to indicate absolute directions or positions.

[Summary of Fuel Cell Vehicle]

Figure 1:
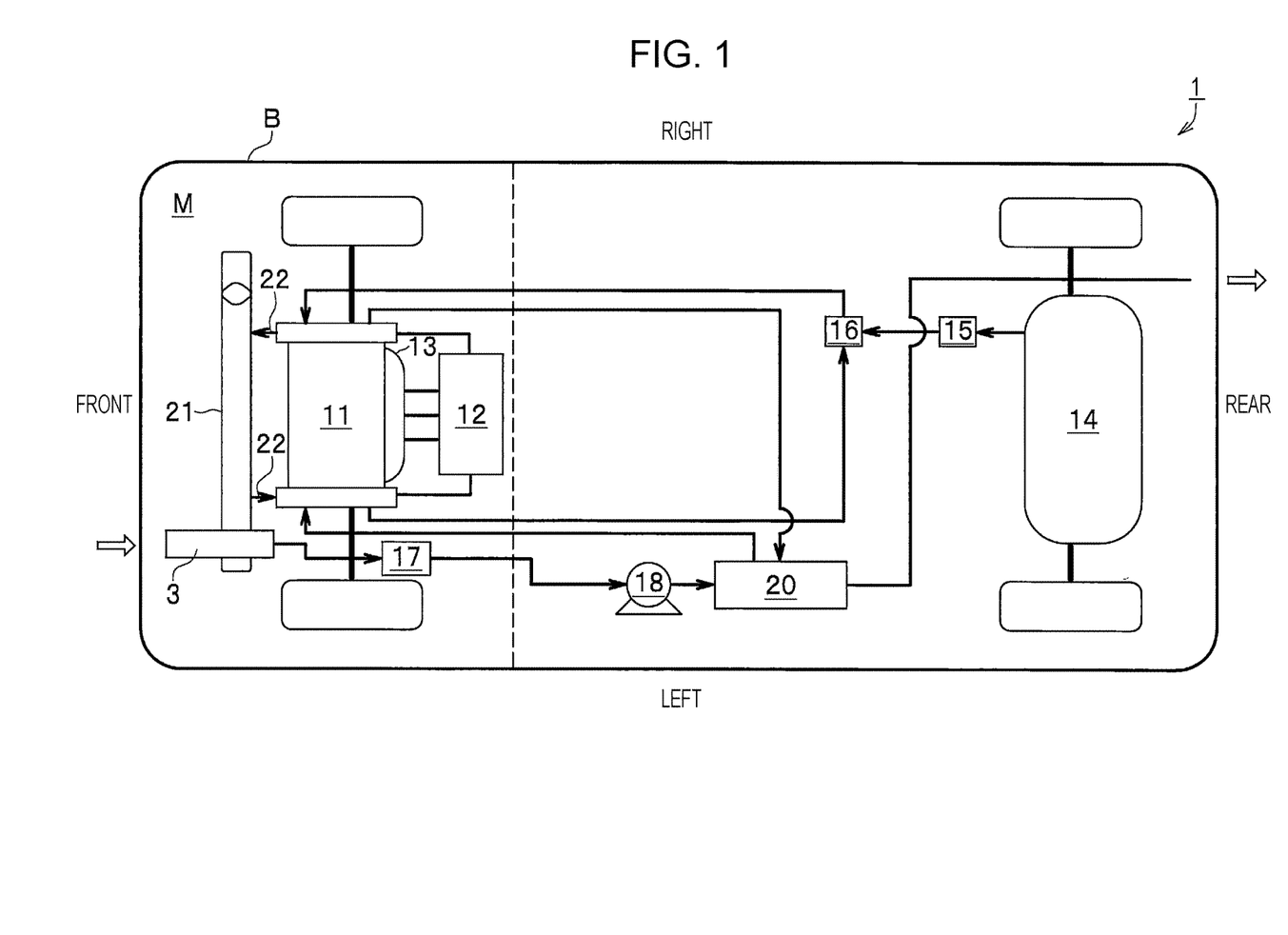
FIG. 1 is a schematic view illustrating entire configuration of a fuel cell vehicle.

Summary of a fuel cell vehicle 1 will be described below with reference to FIG. 1. The fuel cell vehicle 1 includes an air intake structure 3 in accordance with a below-mentioned embodiment. The fuel cell vehicle 1 includes a fuel cell 11, a voltage control unit (VCU) 12 that controls electric power generated by the fuel cell 11, and a motor 13 that generates a driving force using electric power from the voltage control unit 12, in a motor room M (space in a front portion of the vehicle B: space below a bonnet) of a vehicle B. The fuel cell vehicle 1 further includes a hydrogen tank 14, a pressure regulating valve 15 that adjusts the pressure of hydrogen sent from the hydrogen tank 14, and a hydrogen circulator (ejector) 16 that feeds hydrogen fed from the pressure regulating valve 15 to the fuel cell 11, which are components in a fuel line feeding hydrogen as fuel to the fuel cell 11. Unreacted hydrogen collected from the fuel cell 11 is returned to the hydrogen circulator 16. In the present embodiment, the motor room is the motor room of the vehicle B. However, the present disclosure can be also applied to a fuel cell vehicle including the motor 13 located in rear space (space near a trunk) of the vehicle B. Actually, the voltage control unit 12 controls current as well.

The fuel cell vehicle 1 further includes the air intake structure 3 that takes in air from the outside, a general-sized air cleaner 17 that purifies taken air, an air pump 18 that compresses air, and a humidifier 20 that humidifies air, which are components in an air line. The fuel cell vehicle 1 further includes a radiator 21 disposed on the front side of the motor room M, and a cooling water pipe 22 that circulates cooling water between the radiator 21 and the fuel cell 11, which are components in a cooling line for cooling the fuel cell. However, the above-mentioned components are main components of the fuel cell vehicle 1, and other various devices are installed in the fuel cell vehicle 1.

First Embodiment

[Summary of Entire Air Intake Structure]

Next, the air intake structure 3 in First embodiment will be described with reference to the FIGS. 2 to 11. As illustrated in FIGS. 2 to 7, the air intake structure 3 includes an air inlet port 31 disposed in a front portion of the motor room M an air passage 33a in which air flows from the air inlet port 31 to the fuel cell 11, and a water separation passage 33b that branches downward from a branch point 32 at a middle in the air passage 33a to separate water entrained in air, and has a downstream opening 34 on the downstream side of the motor room, and a minimum passage sectional area of the air passage 33a located downstream of the branch point 32 is larger than a minimum passage sectional of the water separation passage 33b. The air passage 33a and the water separation passage 33b is configured of an air intake upper half (upper structure) 35a, a cover plate 35b, and an air intake lower half (intermediate structure) 35c disposed between the air intake upper half 35a and the cover plate 35b. In following description, "front portion of the vehicle B" refers to an area that is in the rear of a radiator grill and in front of the radiator of the vehicle. Although the branch point 32 is described as "middle in the air passage 33a", the branch point includes a substantially same point as a starting point of the air passage 33a. Each of the components will be described below in detail.

[Cover Plate]

Figure 3:
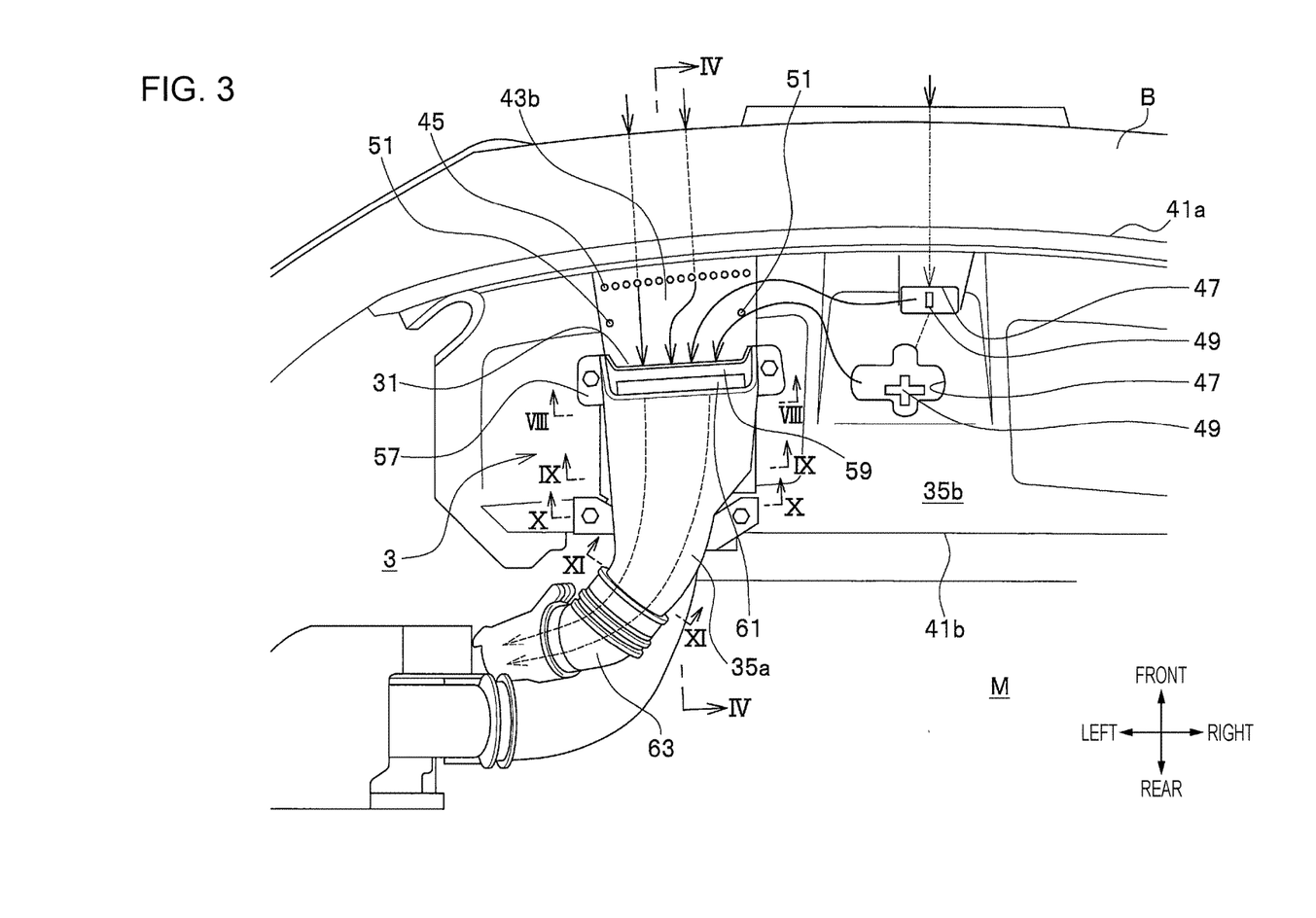
FIG. 3 is a perspective view of a portion of a vehicle including an air intake structure in accordance with First embodiment.
Figure 4:
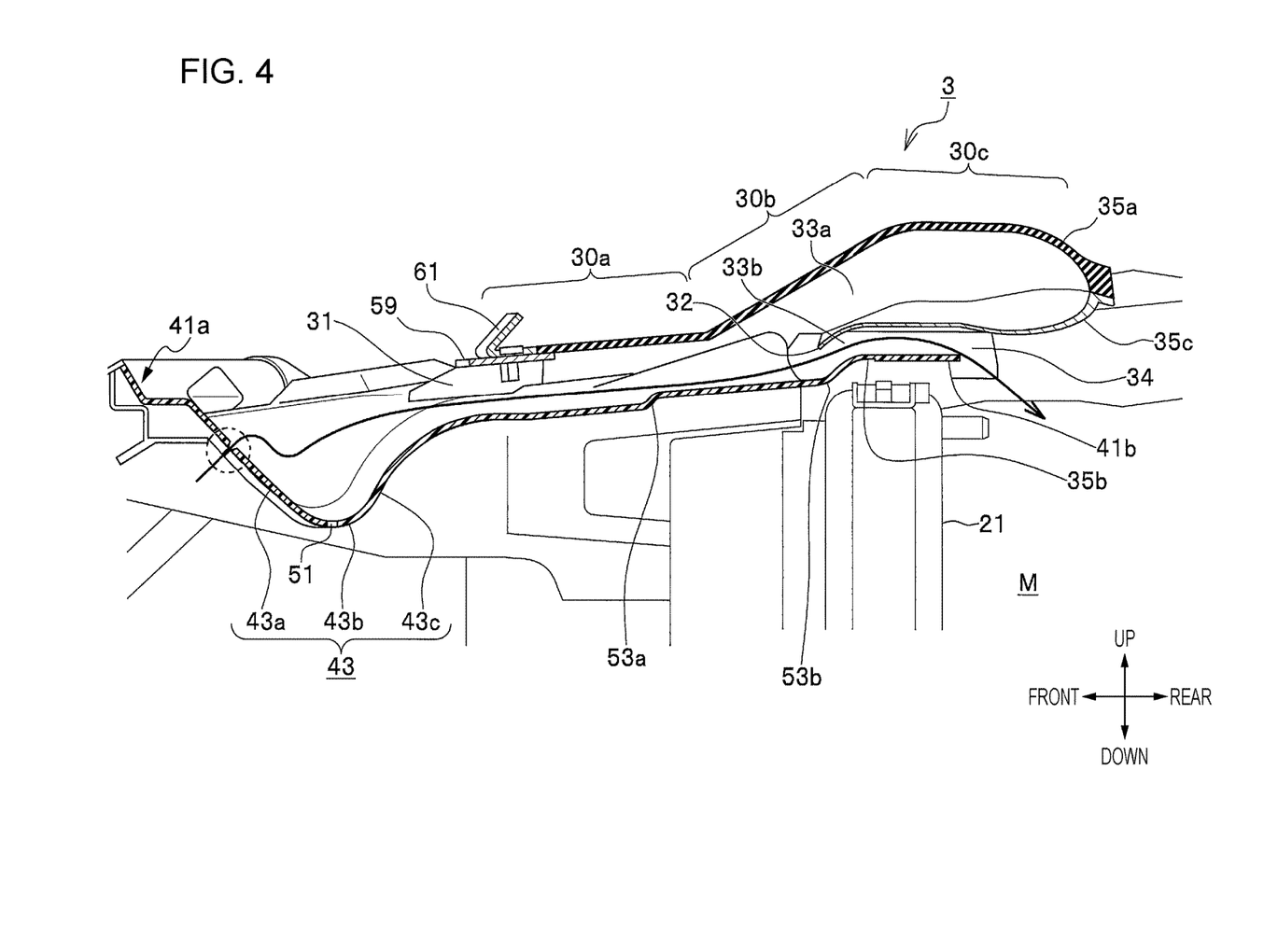
FIG. 4 is a sectional view of an air intake structure taken along a line IV-IV in FIG. 3.

The cover plate 35b is a plate-like resin member disposed in the rear of a radiator grill 37 of the vehicle B (see FIG. 2) and on the top of a front end of the motor room M. The cover plate 35b functions as a decorative panel that covers the components such as the radiator 21 (see FIG. 4). As illustrated in FIG. 3, a front edge 41a of the cover plate 35b is curved along the front edge of the motor room M. As illustrated in FIGS. 3 and 4, a rear edge 41b of the cover plate 35b is terminated to be substantially linear along the width of the vehicle B in the vicinity of the upper end of the radiator 21. The rear edge 41b of the cover plate 35b is located behind the front face of the radiator 21 in the longitudinal direction of the vehicle B, desirably, behind the rear face of the radiator 21. As described later, this can prevent a backward flow of water into the water separation passage 33b. the radiator 21 is a substantially rectangle having predetermined thickness, with one face being oriented to the front of the vehicle B, and the other being oriented to the rear of the vehicle B.

As illustrated in FIG. 4, a recess 43 is formed upstream of the air inlet port 31, and a portion of the recess 43 is inclined upward toward the air inlet port 31. The recess 43 is dented from the remaining portion of the cover plate 35b. Specifically, the recess 43 includes a front inclined face 43a inclined downward from the front edge 41a of the motor room M to the rear, a bottom face 43b that is connected to the front inclined face 43a and located at the lowermost position, and a rear inclined face 43c that is connected to the bottom face 43b and is inclined upward to the front. There is no definite boundary between the front inclined face 43a and the bottom face 43b, and between the bottom face 43b and the rear inclined face 43c, and these faces constitutes a continuous curved face. The front inclined face 43a and the rear inclined face 43c are substantially plane symmetric about a virtual plane that is perpendicular to the bottom face 43b. However, the rear inclined face 43c is curved to protrude upward.

Figure 5:
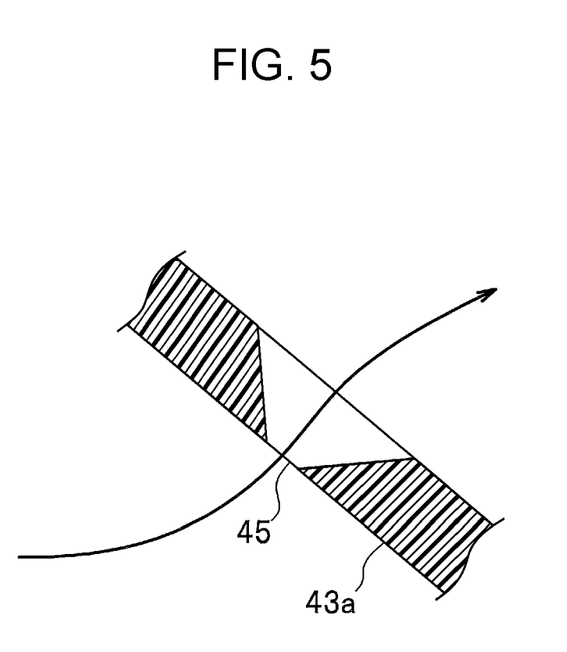
FIG. 5 is an enlarged sectional view of a portion indicated by a dotted circle in FIG. 4.

The front inclined face 43a faces the radiator grill (see FIG. 2), and receives air from the radiator grill 37. As illustrated in FIGS. 3 to 5, a plurality of air openings 45 are substantially horizontally provided in the front inclined face 43a in the width direction of the vehicle B. Thus, when the fuel cell vehicle 1 is driving, air having entered from the radiator grill 37 enters the air openings 45. The air openings 45 are oriented obliquely downward toward the front of the vehicle B, allowing air to pass through while suppressing intrusion of water or snow (hereinafter referred to as "water"). As illustrated in FIG. 5, the air openings 45 each are shaped like a truncated cone extending obliquely downward. In the present embodiment, one row of the air openings 45 are provided. However, two or three or more air openings may be formed. Directional lines in FIGS. 2 and 3 indicate flows of air.

Figure 2:
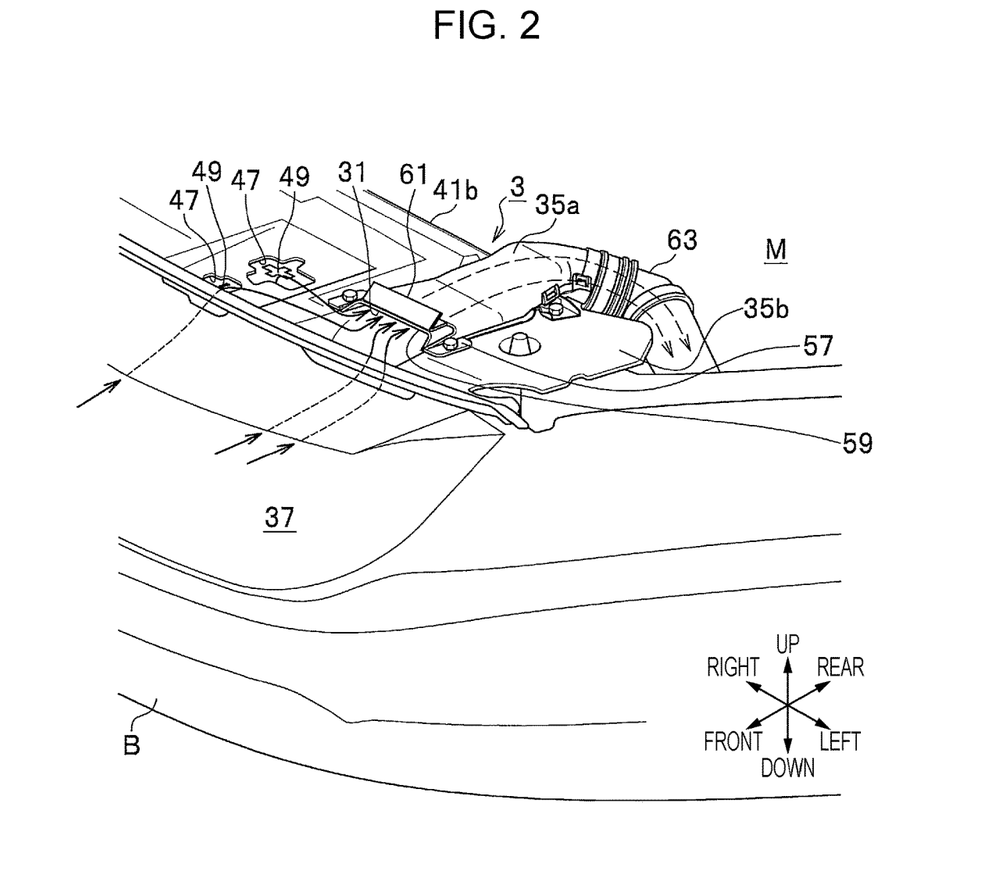
FIG. 2 is a perspective view of a portion of a vehicle including an air intake structure in accordance with First embodiment.

As illustrated in FIG. 2, the cover plate 35b has a predetermined striker opening 47, and a striker 49 that locks a bonnet is exposed from the striker opening 47. The striker opening 47 and the bonnet striker 49 has a clearance therebetween, and air enters the upper face side of the cover plate 35b through the clearance. As illustrated in FIG. 3, the bottom face 43b of the recess 43 has a predetermined drain outlet 51. In the present embodiment, the two drain outlets 51 are provided in both widthwise ends of the bottom face 43b of the vehicle B. The drain outlets serve to discharge water retained in the recess 43.

As illustrated in FIG. 4, as a whole, the cover plate 35b is moderately inclined upward from the front side to the rear side of the vehicle B, in the rear of the rear inclined face 43c. A middle portion 30b of the cover plate 35b has a first step 53a and a second step 53b. Especially, the second step 53b is formed to ensure a vertical clearance between the cover plate 35b and the radiator 21. In the case where the clearance between the cover plate 35b and the radiator 21 is small, when the radiator 21 swings, the radiator 21 contacts the cover plate 35b. When the water level rises in the front face of the radiator 21 up to the vicinity of the top end of the radiator 21, the cover plate 35b may be directly subjected to water pressure. This can deform the cover plate 35b. To avoid the disadvantage, the cover plate 35b is raised from the second step 53b.

Figure 6:
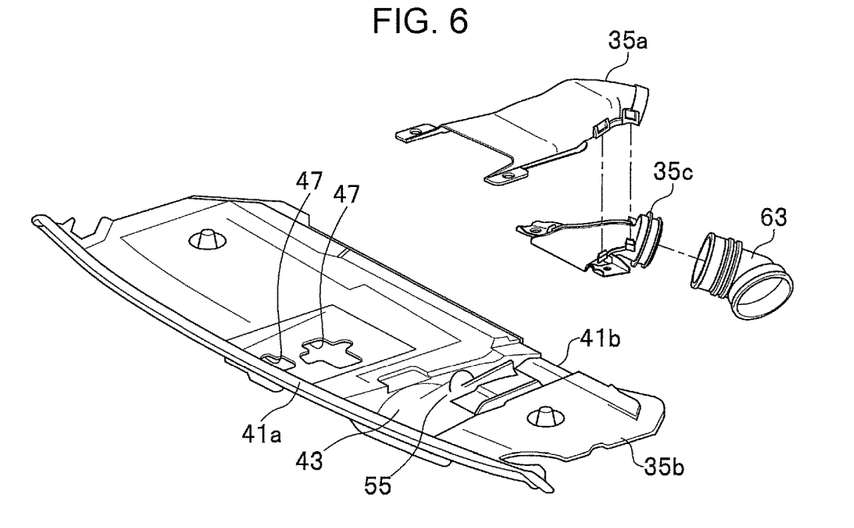
FIG. 6 is an exploded perspective view of main components of the air intake structure illustrated in FIG. 2.

As illustrated in FIG. 6, a portion of the upper face of the cover plate 35b, on which an air intake upper half 35a and an air intake lower half 35c are mounted, forms a cover plate recess 55 dented from the remaining portion of the cover plate 35b. The cover plate recess 55 along with the air intake upper half 35a or the air intake lower half 35c forms a closed cross section to constitute the air passage 33a and the water separation passage 33b. In the present embodiment, the cover plate recess 55 is formed from the most downstream side of the recess 43 o the rear edge 41b over the cover plate 35b. However, the cover plate recess 55 may be formed only near the recess 43. The cover plate recess 55 is not essential, and may be a flat face without any dent. In this case, the air intake upper half 35a and the air intake lower half 35c may ensure the passage sectional area necessary for air intake. A width of the cover plate recess 55 corresponds to a width of the air intake upper half 35a and a width of the air intake lower half 35c.

[Air Intake Upper Half]

The air intake upper half 35a is disposed above the cover plate 35b. An upper portion 30a and the middle portion 30b of the air intake upper half 35a each have an inverted-U like sectional shape having the substantially same width of the width of the recess 43. An opened side of the inverted-U like cross section faces the cover plate recess 55 to form a passage having a substantially rectangular cross section that is longer in the width direction of the vehicle B. As illustrated in FIG. 3, the air intake upper half 35a is the widest in the upper portion 30a, and becomes narrower toward the downstream side. As illustrated in FIG. 4, the height of the air intake upper half 35a is almost uniform in the upper portion 30a, and becomes larger toward the downstream side in the middle portion 30b. The air intake upper half 35a is the highest in a downstream portion 40c. In this manner, the width of the air intake upper half 35a decreases toward the downstream side, and the height of the air intake upper half 35a increases toward the downstream side. Thus, the sectional area of the air passage 33a formed of the air intake upper half 35a does not largely change from the upstream side to the downstream side.

As illustrated in FIGS. 2 and 3, upper stays 57 are horizontally formed on left and right sides of the upper portion 30a of the air intake upper half 35a. The upper stays 57 serve to fix the air intake upper half 35a to the cover plate 35b. Thus, upper stays 57 has a through hole 57a (see FIG. 7), and a fixing bolt is inserted into the through hole 57a. A support fitting 59 having inverted-U like cross section is provided on an inner face of the most upstream portion of the air intake upper half 35a. The support fitting 59 along with the upper stays 57 is fixed to the cover plate 35b. An upper face of the most upstream portion of the air intake upper half 35a is fixed to the support fitting 59. A bent member 61 bent at an acute angle is attached to an upper face of the support fitting 59. When the bonnet is closed, the bent member 61 contacts an inner face of the bonnet. Accordingly, the bent member 61 can block a clearance between the air inlet port 31 and the inner face of the bonnet, preventing air from escaping through the clearance. That is, the bent member 61 reliably takes air into the air inlet port 31.

Figure 7:
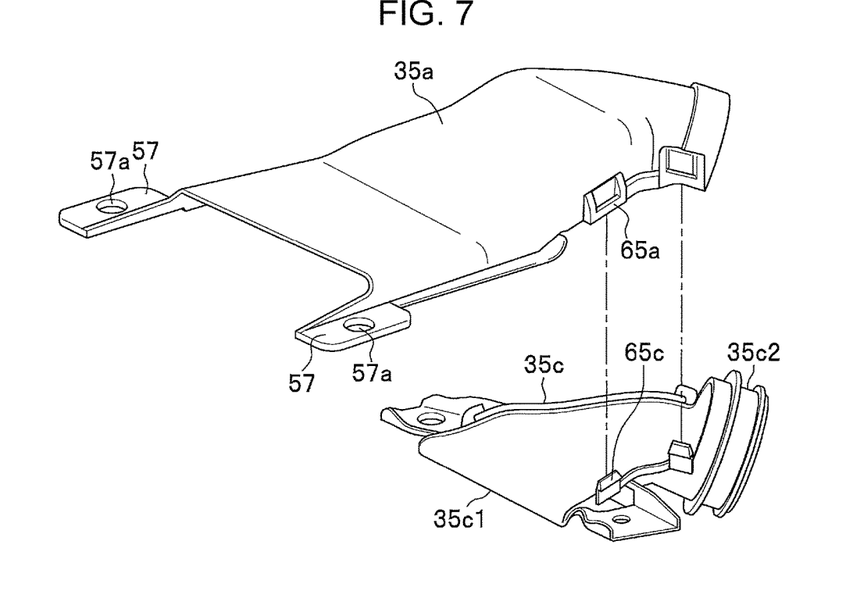
FIG. 7 is an exploded perspective view of an assembled structure of the air intake structure illustrated in FIG. 2.

As illustrated in FIG. 7, a most downstream portion of the air intake upper half 35a has a partially circular sectional shape. A most downstream portion of the air intake lower half 35c has also partially circular sectional shape, and both the most downstream portions form a passage having substantially circular cross section. The air intake upper half 35a is made of an elastically deformable rubber material. The air intake structure 3 is disposed at the most upstream portion of the motor room M, and when the bonnet is dented downward, the air intake upper half 35a can be readily deformed. Examples of the rubber material include dynamic include vulcanization-type thermoplastic elastomer (Thermoplastic Vulcanizates; TPV) and ethylene propylene diene rubber (EPDM). In the present embodiment, TPV is used.

[Air Intake Lower Half]

As illustrated in FIGS. 4 and 6, the air intake lower half 35c is disposed between the air intake upper half 35a and the cover plate 35b. The air intake upper half 35a is connected to the air intake lower half 35c from the middle portion 30b of the air passage 33a to the downstream portion 40c. This generates two vertically separated closed cross sections, and the closed cross sections constitute the air passage 33a and the water separation passage 33b. As illustrated in FIG. 4, a front edge of the air intake lower half 35c is located in the middle portion 30b of the air intake upper half 35a, and in front of the rear edge 41b of the cover plate 35b. The front edge 35c1 of the air intake lower half 35c (see FIG. 7) is located near the second step 53b of the cover plate 35b. The sectional shape of the front edge of the air intake lower half 35c conforms the sectional shape of the second step 53b of the cover plate 35b. The front edge of the air intake lower half 35c becomes the branch point 32 between the air passage 33a and the water separation passage 33b. The material for the cover plate 35b is resin including nylon 6 (PA6), nylon 66 (PA66), polystyrene (PS), and polyethylene (PE). In the present embodiment, polypropylene (PP) resin is used.

As illustrated in FIG. 7, the air intake lower half 35c is connected to the air intake upper half 35a using snap-fit structures 65a, 65c. The connection is made by contact of the rubber material with the resin material to ensure a required sealing property. As illustrated in FIGS. 6 and 7, the most downstream portion of the air intake lower half 35c forms an annular portion 35c2, and an intake pipe 63 is fixed to the outer circumferential face of the annular portion 35c2. This communicates the air passage 33a with the intake pipe 63.

[Sectional Shape Air of Passage and Water Separation Passage]

Figure 8:
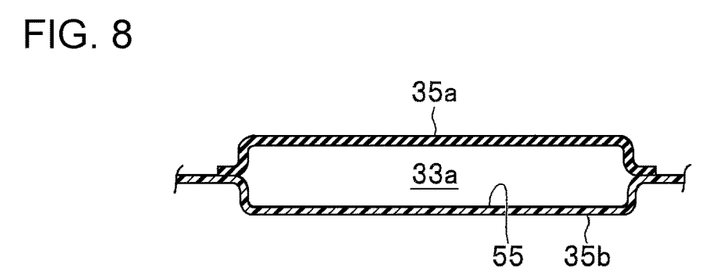
FIG. 8 is a sectional view of an air passage taken along a line VIII-VIII in FIG. 3.
Figure 9:
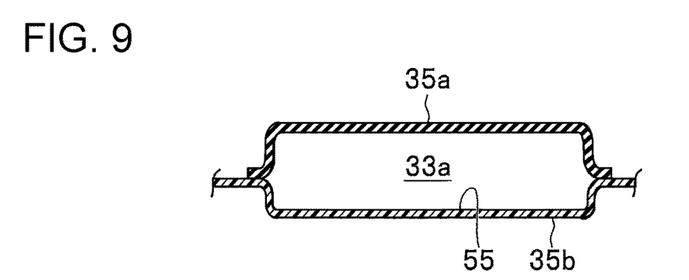
FIG. 9 is a sectional view of the air passage taken along a line IX-IX in FIG. 3.

Next, the sectional shape of the air passage 33a and the water separation passage 33b will be described with reference to FIGS. 3 and 8 to 11. FIGS. 8 to 11 illustrate vertical sectional shape taken along a line VIII-VIII, a line IX-IX, a line X-X, and a line XI-XI in FIG. 3, respectively. Here, the line VIII-VIII indicates the sectional position on the upstream side, and the line XI-XI indicates the sectional position on the downstream side. As illustrated in FIG. 8, the air passage 33a has a low and wide rectangular cross section taken along the line VIII-VIII. As illustrated in FIG. 9, the air passage 33a has a higher and narrower rectangular cross section taken along the line IX-IX than the cross section in FIG. 8.

Figure 10:
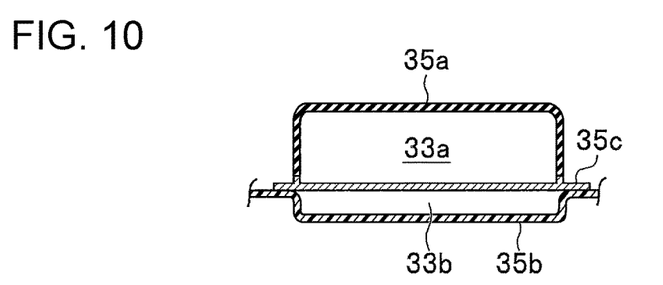
FIG. 10 is a sectional view of the air passage taken along a line X-X in FIG. 3.
Figure 11:
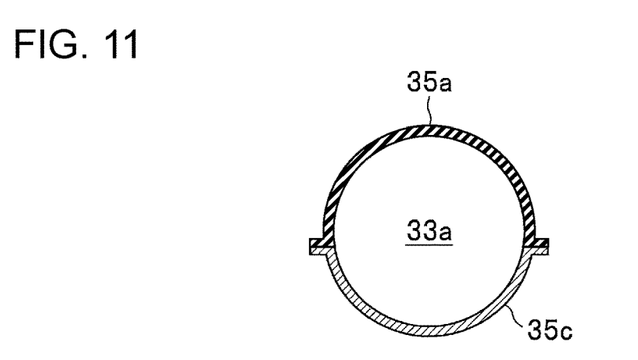
FIG. 11 is a sectional view of the air passage taken along a line XI-XI in FIG. 3.

As illustrated in FIG. 10, at the position taken along the line X-X, the air intake lower half 35c is present in addition to the air intake upper half 35a and the cover plate 35b. The air intake lower half 35c divides the air passage 33a from the water separation passage 33b. Here, the minimum passage sectional area of the air passage 33a is larger, and the minimum passage sectional area of the water separation passage 33b is smaller. This serves to ensure a sufficient quantity of air fed to the fuel cell as well as to prevent backward flow of air and water into the water separation passage 33b through the downstream opening 34. However, when the sectional area of the air passage 33a is sufficiently large, the sectional area of the water separation passage 33b may have any size. As illustrated in FIG. 11, at the position taken along the line XI-XI, the air intake upper half 35a and the air intake lower half 35c forms the air passage 33a having a substantially circular cross section.

[Actions]
[Normal Driving]

Next, actions of the air intake structure 3 in First embodiment will be described. First, the case of normal driving will be described. The normal driving refers to the case where no rain or snow falls, or a road is not flooded. Air from the radiator grill 37 enters the lower face of the cover plate 35b. The air flows to the upper face of the cover plate 35b through the air openings 45 and the striker opening 47 of the cover plate 35b. Air is taken through the air inlet port 31 by a negative pressure generated by the air pump 18, and flows in the air passage 33a. Air guided to the air passage 33a is supplied to the fuel cell 11. At this time, the water separation passage 33b does not work.

[Abnormal Driving]

Next, the case of rainfall, snowfall, or flood will be described. In such case, water in addition to air intrudes from the radiator grill 37 to the lower face of the cover plate 35b. Especially when the vehicle is driving at high speed, or jumps into a flooded road, water markedly enters. In this case, water flows to the upper face of the cover plate 35b through the air openings 45 and the striker opening 47 of the cover plate 35b. Then, water reaches the recess 43. Most water is intercepted by the recess 43. The recess 43 has the drain outlets 51 for discharging water. It is desirable to form the drain outlets 51 at the position closest to the front of the vehicle (closest to the radiator grill 37) as much as possible. This can ensure a sufficient distance between the drain outlets 51 and the radiator 21. Thus, even when water is discharged through the drain outlets 51, water can be reliably prevented from jumping up at the front face of the radiator 21.

However, when a large quantity of water enters for a short time at flood or the like, the drain outlets 51 cannot sufficiently discharge water, such that the recess 43 cannot accommodate water completely. In this case, some water may run up on the rear inclined face 43c (upward inclination) of the recess 43, and enter the air inlet port 31. However, as indicated by directional lines in FIGS. 4 and 6, due to the difference between air and water, water flows into the water separation passage 33b. This can effectively prevent water from flowing into the air passage 33a.

Water entering the water separation passage 33b travels in the water separation passage 33b toward the downstream side. The most downstream portion of the water separation passage 33b has the downstream opening 34, and the downstream opening 34 is opened to the motor room M. For this reason, water is discharged into the motor room M through the downstream opening 34. Here, the downstream opening 34 is provided in the rear of the radiator 21 in the longitudinal direction of the vehicle. In other words, the rear edge 41b of the cover plate 35b extends rearward beyond the radiator 21. For this reason, the discharged water is discharged to the rear side of the radiator 21. When the vehicle is driving during flood, water may enter in front of the radiator 21, increasing the water level on the front face of the radiator 21. Alternatively, water may push on the front face of the radiator 21, causing water to jump up. When the downstream opening 34 is provided in front of the radiator 21, due to an increase in the water level or jump-up of water, water may flow backward into the water separation passage 33b through the water downstream opening 34. However, in the present embodiment, since the downstream opening 34 is provided in the rear of the radiator 21, at which the water level is estimated to be low, backward flow of water can be effectively prevented.

Second Embodiment

[Non-Return Valve]

Figure 12:
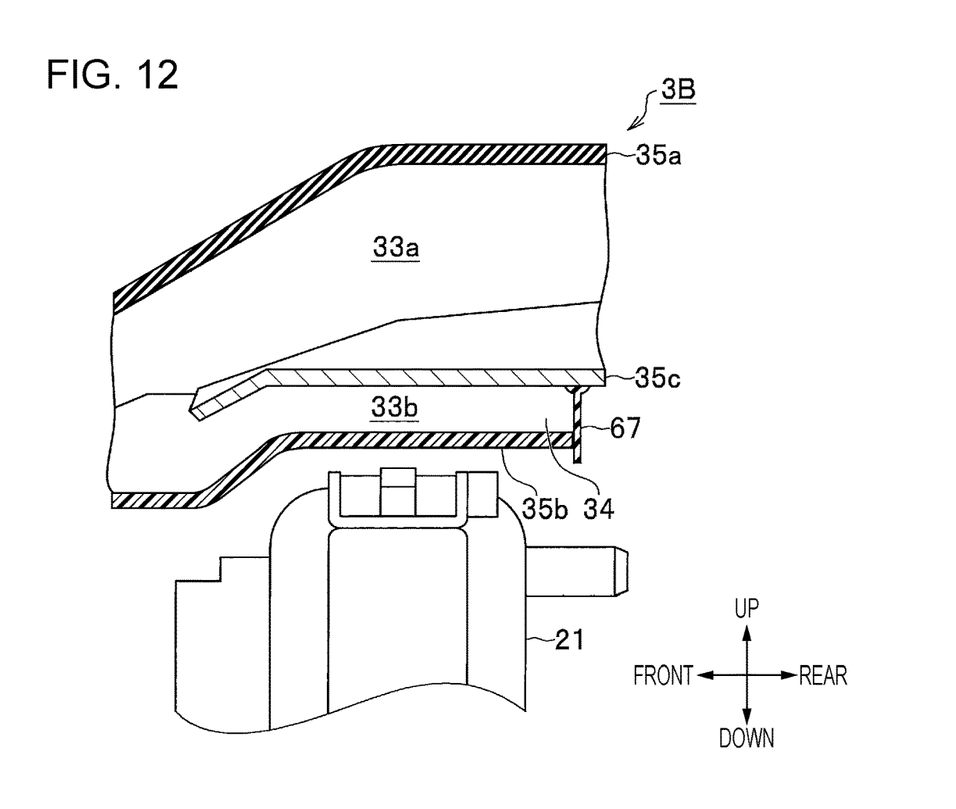
FIG. 12 is a perspective view of a portion of an air intake structure in accordance with Second embodiment.

Next, an air intake structure 3B in accordance with Second embodiment will be described with reference to FIGS. 12 to 14. FIG. 12 is an enlarged sectional view of the downstream opening 34 and its surroundings. In the present embodiment, a non-return valve (non-return unit) 67 is provided in the downstream opening 34. The non-return valve 67 is provided in the downstream opening 34 of the water separation passage 33b, and allows water to flow from the water separation passage 33b to the motor room M, while preventing backward flow of water from the motor room M to the water separation passage 33b. The water separation passage 33b has a negative pressure, and when the downstream opening 34 is opened, air may flow backward into the motor room M. However, the non-return valve 67 allows water to discharge through the downstream opening 34 while preventing backward flow of air through the downstream opening 34. Especially, the downstream opening 34 in the present embodiment is located in the rear of the radiator 21. Accordingly, when no non-return valve 67 is provided, hot air behind the radiator 21 may be sucked. However, the non-return valve 67 can also reliably prevent backward flow of hot air.

Figure 13:
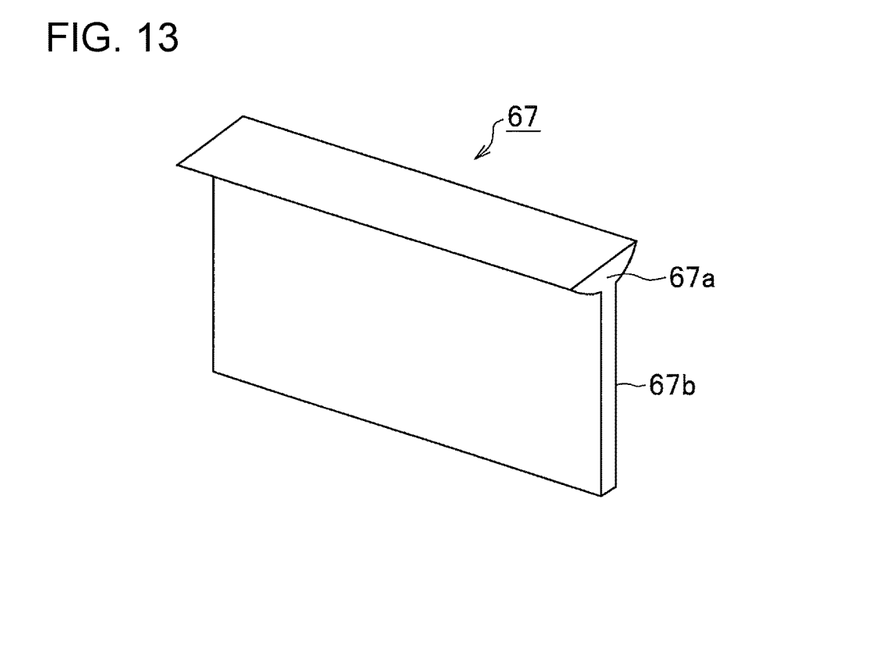
FIG. 13 is a perspective view of a non-return valve including the air intake structure illustrated in FIG. 12.
Figure 14:
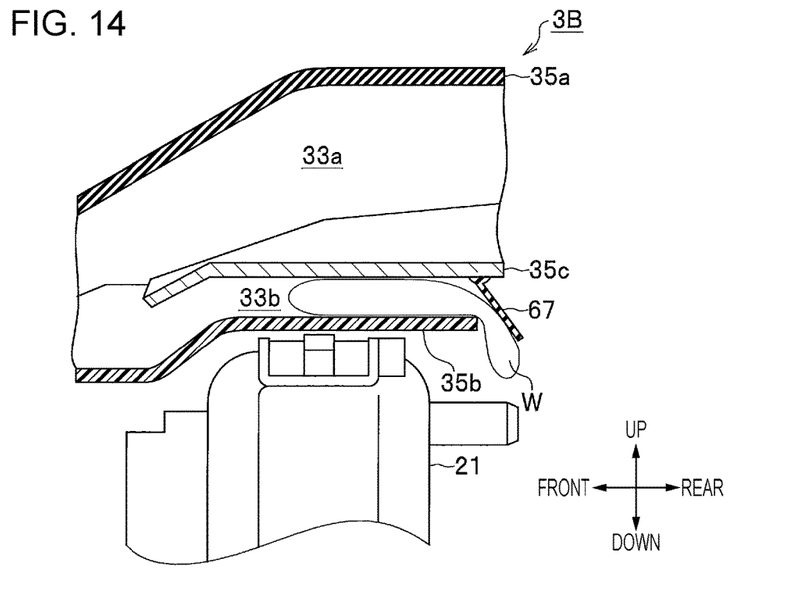
FIG. 14 is a sectional view illustrating the state where the non-return valve illustrated in FIG. 12 is opened.

As illustrated in FIG. 13, the non-return valve 67 in the present embodiment is a flap valve made of an elastic rubber material. That is, the non-return valve 67 includes a valve base 67a having a semicircular cross section, and a flap 67b extending downward from the valve base 67a. The flap 67b is bent with respect to the valve base 67a. When no water enters the water separation passage 33c, as illustrated in FIG. 12, using the negative pressure in the water separation passage 33b, the flap 67b of the non-return valve 67 blocks the downstream opening 34. On the contrary, as illustrated in FIG. 14, when water enters the water separation passage 33b, the flap 67b of the non-return valve 67 is pressed by the dynamic pressure to discharge water through the downstream opening 34. After discharge of water, the flap 67b returns to the original shape, and contacts the downstream opening 34, preventing backward flow of air. Even when water remains in the water separation passage 33b, water in the water separation passage 33c is returned forward by braking of the vehicle, and runs down through the second step 53b and the first step 53a to return to the recess 43. For this reason, water does not retain in the water separation passage 33b for a long time. Elasticity and position of the flap 67b of the non-return valve 67 may be set such that the downstream opening 34 can be closed without no negative pressure.

Third Embodiment

Figure 15:
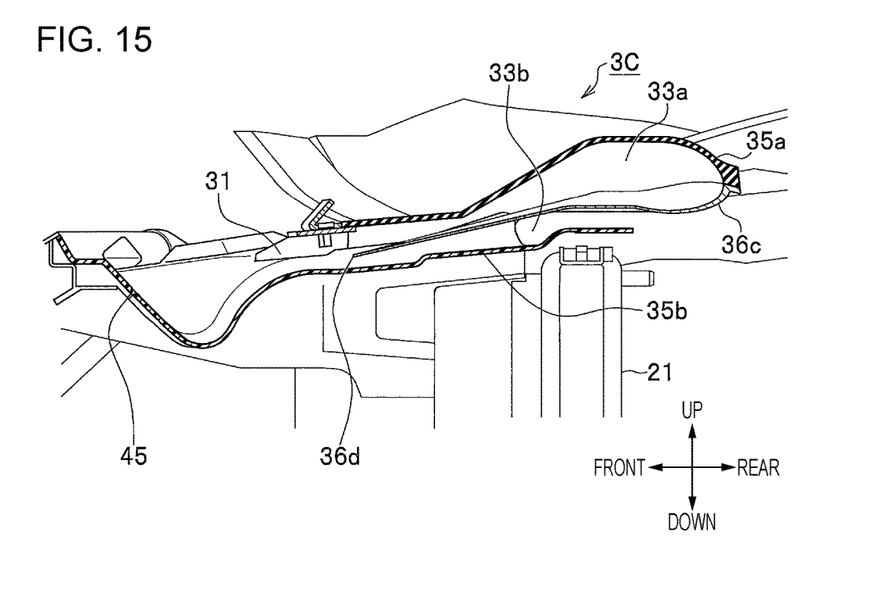
FIG. 15 is a sectional view of an air intake structure in accordance with Third embodiment.

Next, air intake structure 3C in accordance with Third embodiment will be described with reference to FIG. 15. Main components in this embodiment are the same as those in First embodiment except that a front edge 36d of an air intake lower half 36c extends to the vicinity of the air inlet port 31. With such configuration, the water separation passage 33b in the present embodiment is longer than the water separation passage 33b in First embodiment. Accordingly, due to an increase in pressure drop, the negative pressure in the water separation passage 33b on the upstream side does not reach the downstream opening 34. When the downstream opening 34 has no negative pressure, backward flow of air into the water separation passage 33b never occurs. For this reason, the non-return valve 67 in Second embodiment is not required.

Fourth Embodiment

Figure 16:
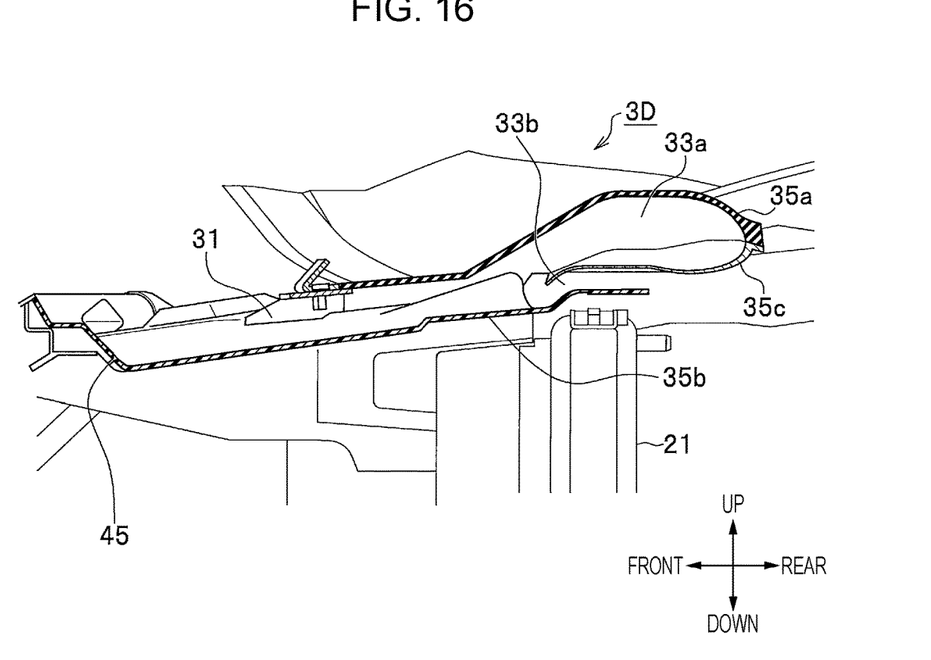
FIG. 16 is a sectional view of an air intake structure in accordance with Fourth embodiment.

Next, an air intake structure 3D in accordance with Fourth embodiment will be described with reference to FIG. 16. The air intake structure 3D in the present embodiment is characterized by omitting the recess 43. That is, the cover plate 36b on the upstream side of the air inlet port 31 is not largely dented. However, as in First and Second embodiments, the cover plate 36b has the air openings 45. Without the recess 43, water cannot be intercepted. However, when the sectional area of the water separation passage 33b is sufficiently large, water can be discharged from the water separation passage 33b.

[Modifications]

All of the above-mentioned embodiments use a cover plate as the cover plates 35b, 36b. However, the present disclosure is not limited to this, and another cover plate may be used. The air passage 33a and the water separation passage 33b are formed of three structures: the air intake upper half 35a, the cover plate 35b, and the air intake lower half 35c. However, these structures may be united. In Second embodiment, the air intake lower half 35c and the non-return valve 67 are separate members. However, the air intake lower half 35c and the non-return valve 67 may be united.

The embodiments are separately described above. However, the components of any embodiment can be applied in other embodiments. Thus, for example, components described in only Second embodiment can be combined with First embodiment. That is, the Applicant inherently assumes that the components are combined with each other as appropriate within the scope of the disclosure.

According to a first aspect of the embodiment, an air intake structure used for a fuel cell vehicle equipped with a fuel cell in front space of a vehicle includes: an air inlet port disposed in a front portion of the front space; an air passage through which air flows from the air inlet port to the fuel cell; and a water separation passage that branches downward from a branch point at a middle in the air passage to separate water entrained in air, and has a downstream opening on a downstream side of the front space. A minimum passage sectional area of the air passage located downstream of the branch point is larger than a minimum passage sectional area of the water separation passage. With such configuration, even when water in addition to air intrudes into the air passage through the air inlet port, due to a difference between air and water in specific gravity, water flows into the water separation passage that branches downward from the branch point, and air flows in the air passage. This can effectively separate air from water. Since the minimum passage sectional area of the air passage is larger than the minimum passage sectional area of the water separation passage, a necessary and sufficient quantity of air flows in the air passage while preventing backward flow of air and water from the downstream opening in the water separation passage.

According to a second aspect of the embodiment, in addition to the configuration of the first aspect, the downstream opening of the water separation passage is located in the rear the radiator. With such configuration, water discharge from the water separation passage falls off behind the radiator. Generally, when water intrudes into the front space during forward travelling at flood, the radiator pushes water forward and thus, the water level is lower in the rear of the radiator than in front of the radiator. The downstream opening is formed on the lower side of water level, suppressing backward flow of water into the water separation passage through the downstream opening.

According to a third aspect of the embodiment, in addition to the configuration of the first or second aspect, there is provided a non-return unit provided in the downstream opening of the water separation passage, the non-return unit allowing water to flow from the water separation passage into the front space, and preventing backward flow of water from the front space into the water separation passage. With such configuration, the non-return unit reliably prevents backward flow of air and water from the front space into the downstream opening. When water intrudes from the upstream side into the water separation passage, the non-return unit is opened to properly discharge water.

According to a fourth aspect of the embodiment, in addition to the configuration of any one of the first to third aspects, a recess is formed upstream of the air inlet port, and a portion of the recess is inclined upward toward the air inlet port. With such configuration, as compared to an uninclined vertical face, a resistance against air flow is smaller. For this reason, air having entered the recess smoothly flows into the air inlet port.

According to a fifth aspect of the embodiment, a fuel cell vehicle includes the air intake structure from any one of the first to fourth aspects, and a fuel cell disposed in the front space and supplied with air flowing in the air passage of the air intake structure. With such configuration, water is separated in the water separation passage of the air intake structure, and does not reach the fuel cell. Thus, an air cleaner or other similar mechanisms need not separate water.

According to the present disclosure, even when the air inlet port is provided in the front portion of the vehicle, intrusion of water and snow into the fuel cell can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. An air intake structure used for a fuel cell vehicle equipped with a fuel cell in front space of the vehicle, the air intake structure comprising:
   an air inlet port disposed in a front portion of the front space;

an air passage through which air flows from the air inlet port to the fuel cell; and a water separation passage that branches downward from a branch point in a middle of the air passage to separate water entrained in the air, the water separation passage having a downstream opening on a downstream side in the front space, wherein a minimum passage sectional area of the air passage located downstream of the branch point is larger than a minimum passage sectional area of the water separation passage.

2. The air intake structure according to claim 1, wherein the downstream opening of the water separation passage is located behind a radiator.

3. The air intake structure according to claim 1, further comprising:

a non-return unit provided in the downstream opening of the water separation passage, the non-return unit allowing water to flow from the water separation passage into the front space, and preventing backward flow of water from the front space into the water separation passage.

4. The air intake structure according to claim 1, wherein a recess is formed upstream of the air inlet port, and a portion of the recess is inclined upward toward the air inlet port.

5. A fuel cell vehicle comprising:

the air intake structure according to claim 1; and a fuel cell disposed in the front space and supplied with air flowing in the air passage of the air intake structure.

6. An air intake structure for a fuel cell vehicle, comprising:

an air inlet port provided in a front space in which a fuel cell is accommodated; the front space being provided at a front of the fuel cell vehicle which has a vehicle height direction;

an air passage connected to the air inlet port such that air flows from the air inlet port to the fuel cell through the air passage, the air passage having a branch point and a first minimum passage sectional area located downstream with respect to the branch point; and a water separation passage having a downstream opening in the front space and extending from the branch point to the downstream opening below the air passage in the vehicle height direction to separate water from the air, the water separation passage having a second minimum passage sectional area which is smaller than the first minimum passage sectional area.

7. The air intake structure according to claim 6, wherein the downstream opening of the water separation passage is located behind a radiator.

8. The air intake structure according to claim 6, further comprising:

a non-return unit provided in the downstream opening of the water separation passage, the non-return unit allowing water to flow from the water separation passage into the front space, and preventing backward flow of water from the front space into the water separation passage.

9. The air intake structure according to claim 6, wherein a recess is provided upstream of the air inlet port, and a portion of the recess is inclined upward toward the air inlet port.

10. A fuel cell vehicle comprising:

the air intake structure according to claim 6; and a fuel cell disposed in the front space and supplied with air flowing in the air passage of the air intake structure.

11. The air intake structure according to claim 1, wherein a portion of the air passage downstream of the branch point has a cross-section with a first enclosed circumferential surface defining the portion of the air passage downstream of the branch point; and wherein a portion of the water separation passage downstream of the branch point has a cross-section with a second enclosed circumferential surface defining the portion of the water separation passage downstream of the branch point.

12. The air intake structure according to claim 11, wherein the minimum passage sectional area of the air passage located downstream of the branch point is located at the portion of the air passage downstream of the branch point that has the cross-section with the first enclosed circumferential surface, and wherein the minimum passage sectional area of the water separation passage located downstream of the branch point is located at the portion of the water separation passage downstream of the branch point that has the cross-section with the second enclosed circumferential surface.

13. The air intake structure according to claim 6, wherein a portion of the air passage downstream of the branch point has a cross-section with a first enclosed circumferential surface defining the portion of the air passage downstream of the branch point; and wherein a portion of the water separation passage downstream of the branch point has a cross-section with a second enclosed circumferential surface defining the portion of the water separation passage downstream of the branch point.

14. The air intake structure according to claim 13, wherein the first minimum passage sectional area is located at the portion of the air passage downstream of the branch point that has the cross-section with the first enclosed circumferential surface, and wherein the second minimum passage sectional area is located at the portion of the water separation passage downstream of the branch point that has the cross-section with the second enclosed circumferential surface.

* * * * *